(12) United States Patent
McCune

(10) Patent No.: US 10,247,020 B2
(45) Date of Patent: Apr. 2, 2019

(54) FLUID COLLECTION GUTTER FOR A GEARED TURBINE ENGINE

(71) Applicant: United Technologies Corporation, Hartford, CT (US)

(72) Inventor: Michael E. McCune, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 512 days.

(21) Appl. No.: 14/761,227

(22) PCT Filed: Jan. 15, 2013

(86) PCT No.: PCT/US2013/021575
§ 371 (c)(1),
(2) Date: Jul. 15, 2015

(87) PCT Pub. No.: WO2014/112977
PCT Pub. Date: Jul. 24, 2014

(65) Prior Publication Data
US 2015/0361810 A1 Dec. 17, 2015

(51) Int. Cl.
*F01D 9/06* (2006.01)
*F01D 25/18* (2006.01)
(Continued)

(52) U.S. Cl.
CPC ............. *F01D 9/065* (2013.01); *F01D 25/18* (2013.01); *F02C 3/107* (2013.01);
(Continued)

(58) Field of Classification Search
CPC .... F01D 9/065; F01D 25/18; F05D 2260/602; F16H 57/0482; F16H 57/042; F16H 57/0421; F16H 57/0423; F16H 57/0424
See application file for complete search history.

(56) References Cited

U.S. PATENT DOCUMENTS

| 4,531,358 A | 7/1985 | Smith |
| 5,433,674 A | 7/1995 | Sheridan et al. |

(Continued)

FOREIGN PATENT DOCUMENTS

| EP | 2559913 | 2/2013 |
| JP | 58168804 | 10/1983 |

(Continued)

OTHER PUBLICATIONS

EP search report for EP13871526.3 dated Jan. 13, 2016.
(Continued)

*Primary Examiner* — Gerald L Sung
*Assistant Examiner* — William Breazeal
(74) *Attorney, Agent, or Firm* — O'Shea Getz P.C.

(57) ABSTRACT

A turbine engine system includes a gutter and a gear train with an axial centerline. The gutter is disposed radially outside of the axial centerline. The gutter includes an inner surface and a channel that receives fluid directed out of the gear train. The inner surface at least partially defines a bore in which the gear train is arranged. The channel extends radially into the gutter from the inner surface, and circumferentially to a channel outlet. The bore has a cross-sectional bore area, and the channel has a cross-sectional channel area that is substantially equal to or less than about two percent of the bore area.

15 Claims, 10 Drawing Sheets

(51) Int. Cl.
  *F02C 3/107* (2006.01)
  *F16H 57/04* (2010.01)
(52) U.S. Cl.
  CPC .............. *F05D 2260/40311* (2013.01); *F05D 2260/602* (2013.01); *F16H 57/0423* (2013.01); *F16H 57/0486* (2013.01); *Y02T 50/671* (2013.01)

(56) References Cited

U.S. PATENT DOCUMENTS

| | | | |
|---|---|---|---|
| 5,472,383 A | 12/1995 | McKibbin | |
| 6,223,616 B1* | 5/2001 | Sheridan | F16H 1/2827 184/6.12 |
| 6,996,968 B2 | 2/2006 | Peters et al. | |
| 7,591,754 B2 | 9/2009 | Duong | |
| 7,699,530 B2 | 4/2010 | Blais | |
| 7,704,178 B2 | 4/2010 | Sheridan et al. | |
| 7,824,305 B2 | 11/2010 | Duong | |
| 7,878,303 B2 | 2/2011 | Munson | |
| 7,883,439 B2 | 2/2011 | Sheridan et al. | |
| 7,926,260 B2 | 4/2011 | Sheridan et al. | |
| 8,020,665 B2 | 9/2011 | Sheridan et al. | |
| 8,172,716 B2 | 5/2012 | McCune | |
| 8,205,432 B2 | 6/2012 | Sheridan | |
| 8,215,454 B2 | 7/2012 | Portlock et al. | |
| 8,230,974 B2 | 7/2012 | Parnin | |
| 8,246,503 B2 | 8/2012 | Sheridan et al. | |
| 8,276,275 B2 | 10/2012 | Sheridan et al. | |
| 8,511,057 B2 | 8/2013 | Fomison et al. | |
| 8,747,272 B2 | 6/2014 | Imai et al. | |
| 8,905,885 B2 | 12/2014 | Yamamoto et al. | |
| 2008/0044276 A1* | 2/2008 | McCune | F01D 5/027 415/122.1 |
| 2008/0116010 A1* | 5/2008 | Portlock | F01D 25/18 184/6.12 |
| 2008/0134657 A1 | 6/2008 | DiBenedetto et al. | |
| 2009/0090096 A1 | 4/2009 | Sheridan | |
| 2010/0058729 A1 | 3/2010 | Fomison et al. | |
| 2010/0113204 A1* | 5/2010 | Zeirke | B60K 7/0007 475/159 |
| 2010/0331139 A1 | 12/2010 | McCune | |
| 2010/0331140 A1 | 12/2010 | McCune | |
| 2011/0108360 A1* | 5/2011 | DiBenedetto | F01D 25/18 184/6.11 |
| 2011/0297485 A1 | 12/2011 | Sheridan et al. | |
| 2012/0088624 A1 | 4/2012 | Sheridan | |
| 2012/0192570 A1 | 8/2012 | McCune et al. | |
| 2012/0324899 A1 | 12/2012 | DiBenedetto et al. | |
| 2013/0029802 A1 | 1/2013 | Fox | |
| 2013/0095974 A1 | 4/2013 | Imai et al. | |
| 2013/0102432 A1 | 4/2013 | Imai et al. | |
| 2015/0292517 A1 | 10/2015 | Bucking | |

FOREIGN PATENT DOCUMENTS

| | | |
|---|---|---|
| WO | WO2012027184 A2 | 3/2012 |
| WO | WO2012105482 A1 | 8/2012 |

OTHER PUBLICATIONS

Office action for U.S. Appl. No. 14/761,241 dated Jun. 21, 2017.
Office action for U.S. Appl. No. 14/761,241 dated Dec. 15, 2017.
EP search report for EP13872239.2 dated Dec. 23, 2015.
Office action for U.S. Appl. No. 14/761,241 dated May 9, 2018.
Office action for EP13872239.2 dated Jan. 4, 2019.

* cited by examiner

FLUID COLLECTION GUTTER FOR A GEARED TURBINE ENGINE

This application claims priority to PCT Patent Application No. PCT/US13/21575 filed Jan. 15, 2013, which is hereby incorporated by reference.

BACKGROUND OF THE INVENTION

1. Technical Field

This disclosure relates generally to a turbine engine and, more particularly, to a fluid collection gutter for a turbine engine gear train.

2. Background Information

A typical geared turbofan engine includes a fan section, a compressor section, a combustor section and a turbine section. A rotor of the fan section is connected to and driven by a rotor of the turbine section through a shaft and a gear train. During engine operation, lubrication oil is provided to the gear train to lubricate and cool components of the gear train. The gear train may subsequently direct this lubrication oil to a gutter that circumscribes the gear train.

Various gutter configurations are known in the art, some of which may have relatively low oil capture efficiencies. Such a gutter therefore may collect a relatively small amount of the lubrication oil that is initially directed to the gutter by the gear train. The uncollected lubrication oil may churn in a space defined radially between the gutter and the gear train. The churning lubrication oil may re-contact the gear train, which may reduce power transfer efficiency of the gear train between the turbine rotor and the fan rotor. A low oil capture efficiency may also reduce the amount of lubrication oil available to an auxiliary lubrication system, which provides the lubrication oil to the gear train during negative g maneuvers.

There is a need in the art for a gutter with an improved fluid capture efficiency.

SUMMARY OF THE DISCLOSURE

According to an aspect of the invention, a turbine engine system is provided that includes a gutter and a gear train with an axial centerline. The gutter is disposed radially outside of the axial centerline. The gutter includes an inner surface and a channel that receives fluid directed out of the gear train. The inner surface at least partially defines an axial bore in which the gear train is arranged. The channel extends radially into the gutter from the inner surface, and circumferentially to a channel outlet. The bore has a cross-sectional bore area, and the channel has a cross-sectional channel area that is substantially equal to or less than about two percent of the bore area.

According to another aspect of the invention, another turbine engine system is provided that includes a gutter and a gear train with an axial centerline. The gutter is disposed radially outside of the axial centerline. The gutter at least partially circumscribes the gear train, and includes an inner surface and a channel that receives fluid directed out of the gear train. The channel extends radially into the gutter from the inner surface, and circumferentially to a channel outlet. The inner surface has a surface radius. The channel has a radially extending channel height that is substantially equal to or less than about eight percent of the surface radius.

According to still another aspect of the invention, another turbine engine system is provided that includes a gutter and a gear train with an axial centerline. The gutter is disposed radially outside of the axial centerline. The gutter at least partially circumscribes the gear train, and includes an inner surface and a channel that receives fluid directed out of the gear train. The channel extends radially into the gutter from the inner surface, and circumferentially to a channel outlet. The inner surface has a surface radius. The channel has an axially extending channel width that is substantially equal to or less than about fifteen percent of the surface radius.

The inner surface may at least partially define a bore in which the gear train is arranged. The bore may have a cross-sectional bore area, and the channel may have a cross-sectional channel area that may be substantially equal to or less than about two percent of the bore area.

The channel may have an axially extending channel width that may be substantially equal to or less than about fifteen percent of the surface radius. The channel may also or alternatively have a radially extending channel height that may be substantially equal to or less than about eight percent of the surface radius.

The inner surface may have a surface radius. The channel may have a radially extending channel height that may be substantially equal to or less than about eight percent of the surface radius. The channel may also or alternatively have an axially extending channel width that may be substantially equal to or less than about fifteen percent of the surface radius.

The channel area may be defined by at least a portion of the channel located adjacent and upstream of the channel outlet.

The channel outlet may have a cross-sectional outlet area that may be between about fifty-five and about seventy-five percent of the channel area.

At least a portion of the channel may have a cross-sectional geometry that may transition between a first geometry and a second geometry as the channel extends circumferentially within the gutter.

At least a portion of the channel may have a substantially rectangular cross-sectional channel geometry.

The channel may extend radially into the gutter to a channel end. At least a portion of the channel may have a cross-sectional channel geometry that may taper axially as the channel extends radially towards the channel end.

At least a portion of the channel may have a cross-sectional channel geometry formed by an inner region and an outer region located radially outboard of the inner region. The inner region may have a substantially rectangular geometry, and the outer region may have a substantially triangular geometry.

The channel outlet may have a substantially triangular cross-sectional geometry.

The gutter may include a conduit that extends through the gutter and/or spirals at least partially around the centerline between the channel outlet and a conduit outlet.

The gear train may include one or more fluid passages arranged circumferentially around the centerline and aligned axially with the channel. The one or more fluid passages may be fluidly coupled to the channel outlet through the channel.

The gear train may be configured as a planetary gear train or a star gear train, or any other type of epicyclic gear train.

The system may include a plurality of turbine engine rotors arranged along the axial centerline. The engine rotors may include a first rotor and a second rotor. Each of the engine rotors may include a plurality of rotor blades arranged around and connected to a rotor disk. The first rotor may be connected to and driven by the second rotor through the gear train.

The first rotor may be configured as a fan rotor and/or the second rotor may be configured as a turbine rotor. Alternatively, the first and/or the second rotors may be configured as any other type of turbine engine rotor.

The foregoing features and the operation of the invention will become more apparent in light of the following description and the accompanying drawings.

DETAILED DESCRIPTION OF THE INVENTION

Figure 1:
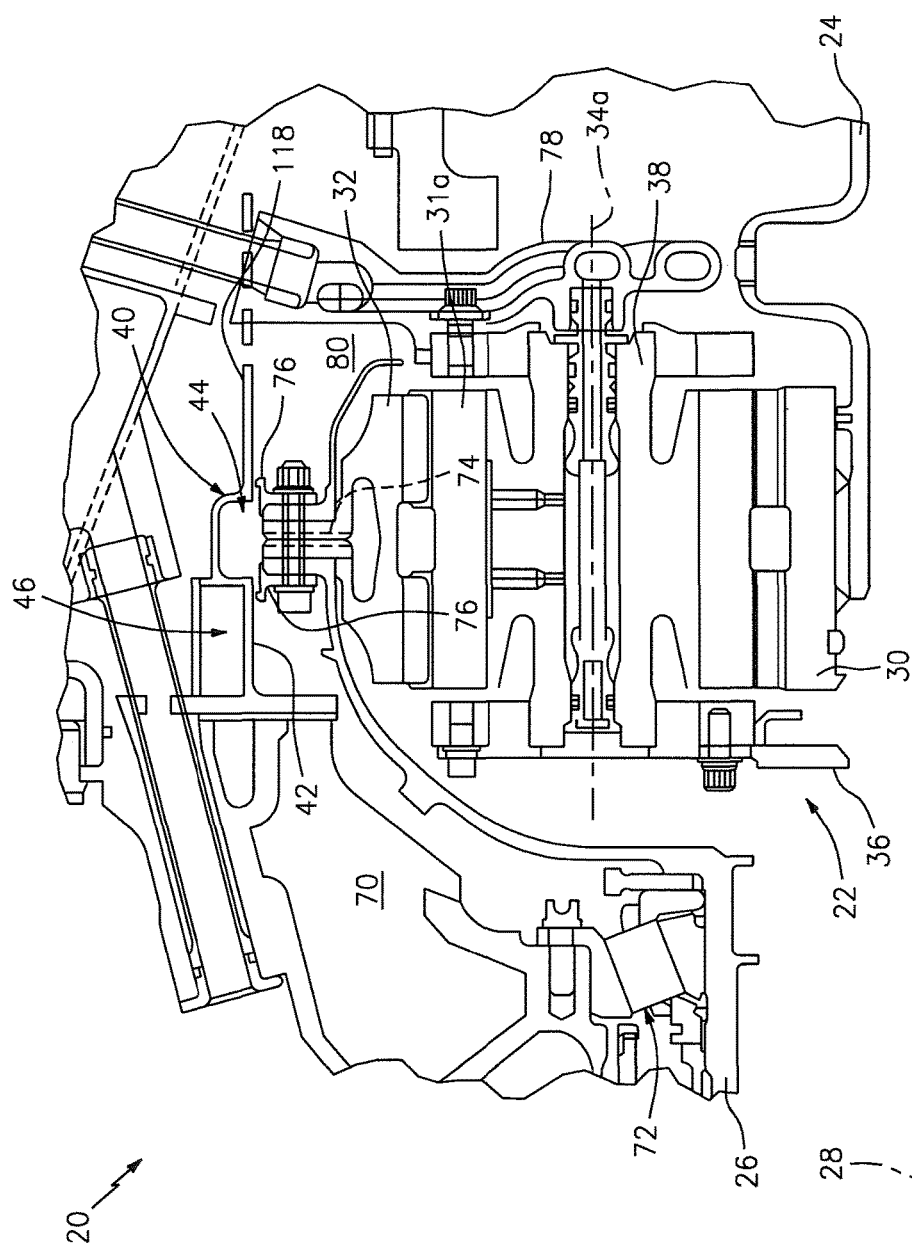
FIG. 1 is a partial side sectional illustration of a turbine engine system.

FIG. 1 illustrates a turbine engine system 20 that includes a gear train 22 (e.g., an epicyclic gear train), a rotational input element 24 and a rotational output element 26. The gear train 22 has an axial centerline 28, and is connected to and transmits mechanical power between the input element 24 and the output element 26. The input element 24 is a turbine engine shaft, and the output element 26 is a turbine engine rotor (e.g., a fan rotor).

Figure 2:
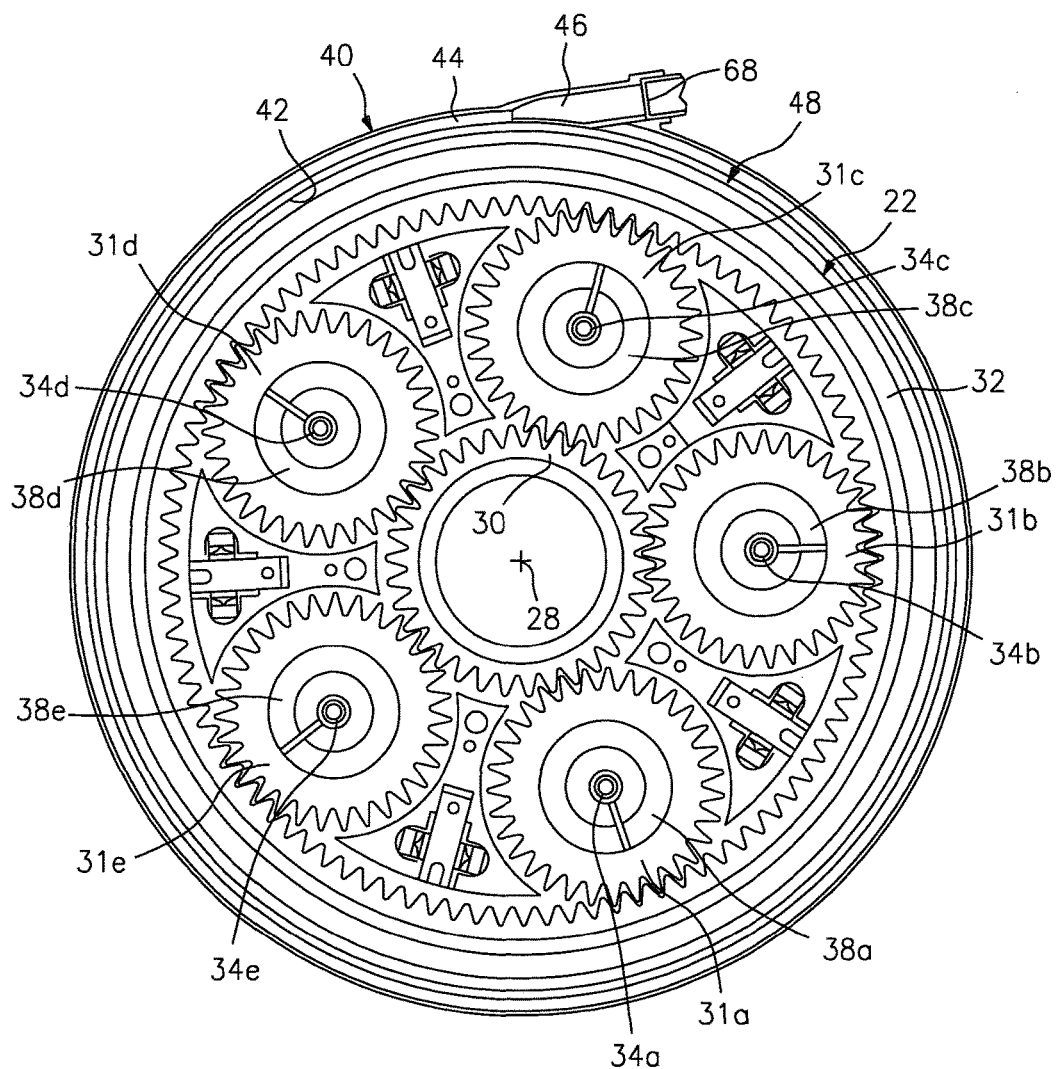
FIG. 2 is an illustration of an end of a star gear train for the system of FIG. 1.
Figure 3:
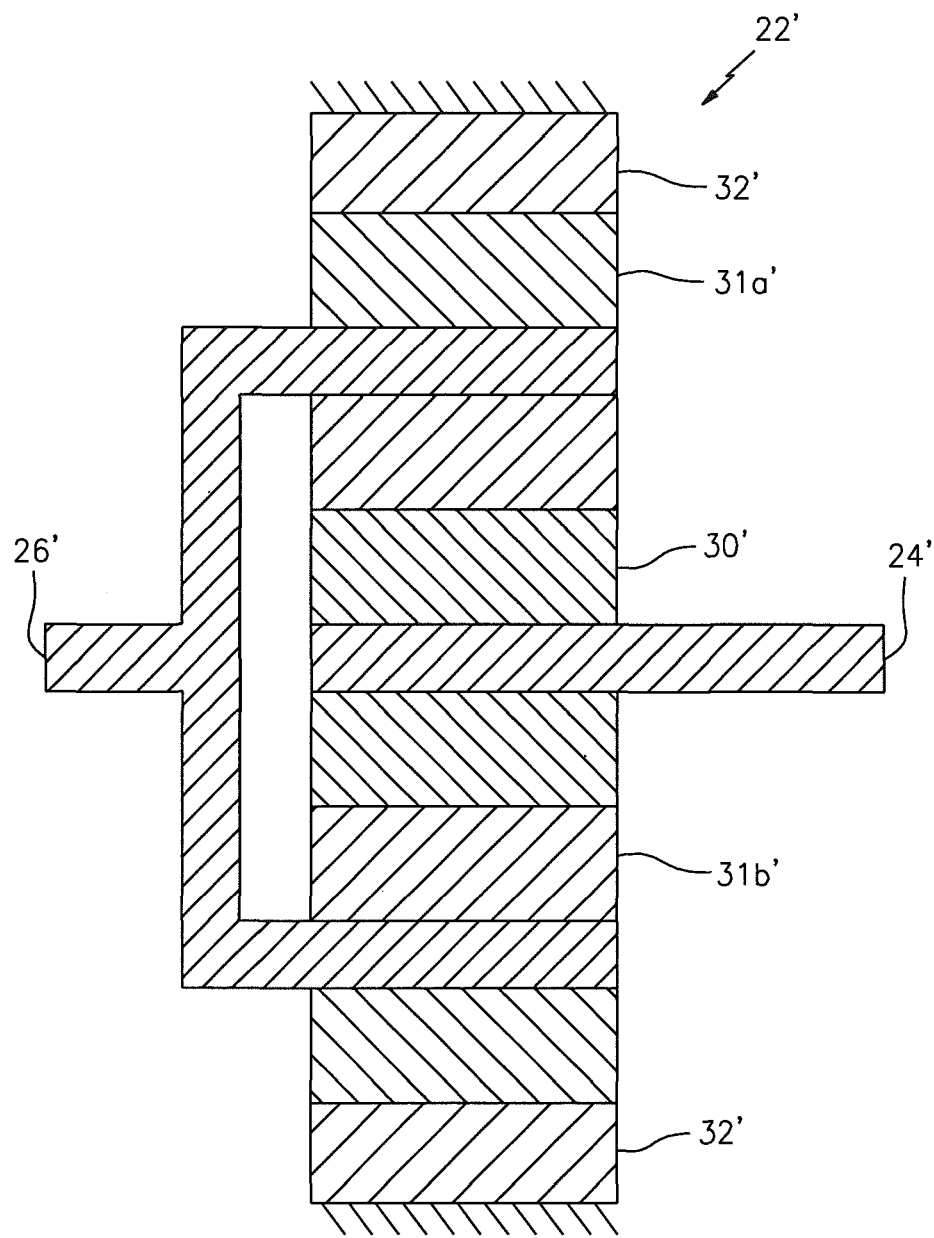
FIG. 3 is a schematic side section illustration of a planetary gear train for the system of FIG. 1.

Referring to FIGS. 1 and 2, the gear train 22 includes a plurality of gears 30, 31a-e and 32 arranged in a star gear train configuration. Alternatively, the gears may be arranged in a planetary gear train configuration, or any other type of gear train configuration. For example, FIG. 3 is a schematic illustration of another gear train 22' that includes a plurality of gears 30', 31a-b' and 32' arranged in a planetary gear train configuration. Referring again to FIGS. 1 and 2, the gears include a sun gear 30, one or more star gears 31a-e, and a ring gear 32.

The sun gear 30 is rotatable about the centerline 28, and is connected to the input shaft 24 through a joint such as a spline joint. The star gears 31a-e are arranged circumferentially around the centerline 28. The star gears 31a-e are radially meshed between the sun gear 30 and the ring gear 32. Each of the star gears 31a-e is rotatable about a respective axis 34a-e.

Each of the star gears 31a-e is rotatably connected to a stationary gear carrier 36 through a respective bearing 38a-e. Each bearing 38a-e may be a journal bearing as illustrated in FIGS. 1 and 2, or alternatively any other type of bearing such as a roller element bearing, etc. The gear carrier 36 is connected to a turbine engine case through a support strut and/or a flexible support.

The ring gear 32 is rotatable about the centerline 28, and is connected to the output element 26 through a joint such as a bolted flange joint. Alternatively, the ring gear may be connected to the input element and the sun gear may be connected to the output element.

The turbine engine system 20 also includes a fluid collection gutter 40 that at least partially circumscribes the gear train 22. The gutter 40 of FIG. 2, for example, is configured as an annular body that extends circumferentially around the centerline 28. The gutter 40 includes a gutter inner surface 42, a fluid collection channel 44 and a fluid return conduit 46. The inner surface 42 at least partially defines a bore 48 (e.g., an axial gutter bore) in which the gear train 22 is arranged.

Figure 4:
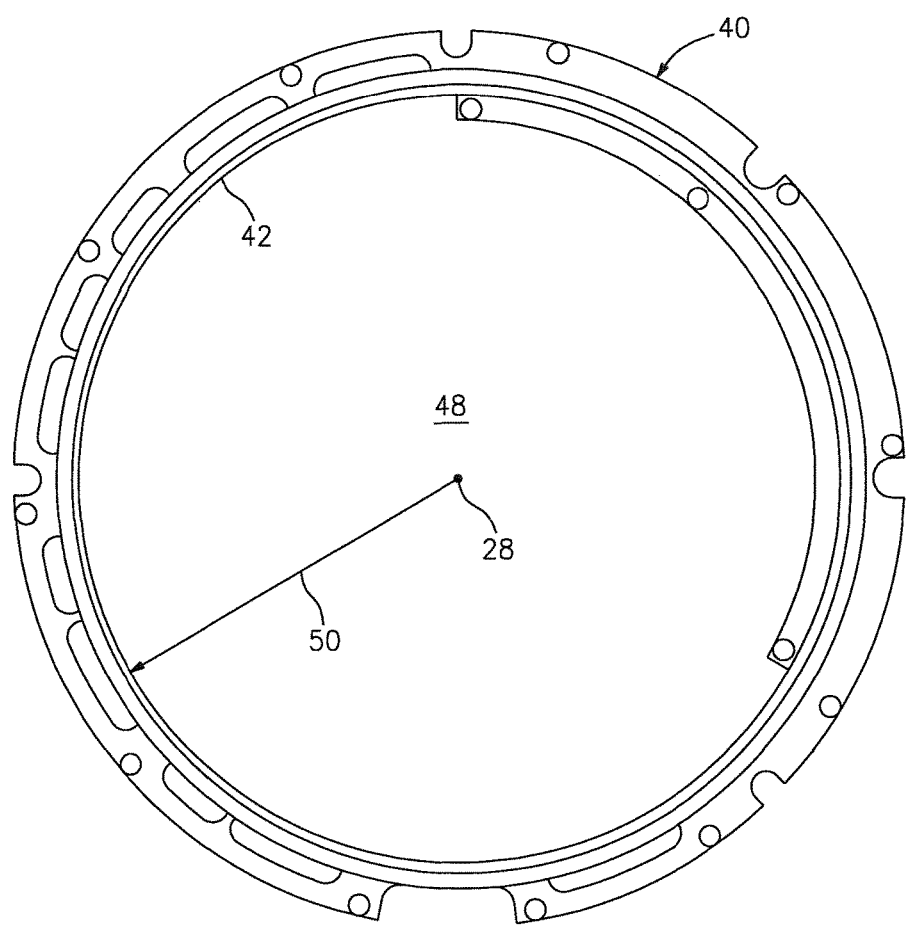
FIG. 4 is an illustration of an end of a gutter for the system of FIG. 1.

Referring to FIG. 4, the bore 48 has an inner surface 42 that is defined by a substantially circular cross-sectional geometry. The inner surface 42 has a bore area defined by a surface radius 50. Alternatively, the bore 48 may have various other non-circular (e.g., arcuate or polygonal) cross-sectional geometries that define the bore area.

Figure 5:
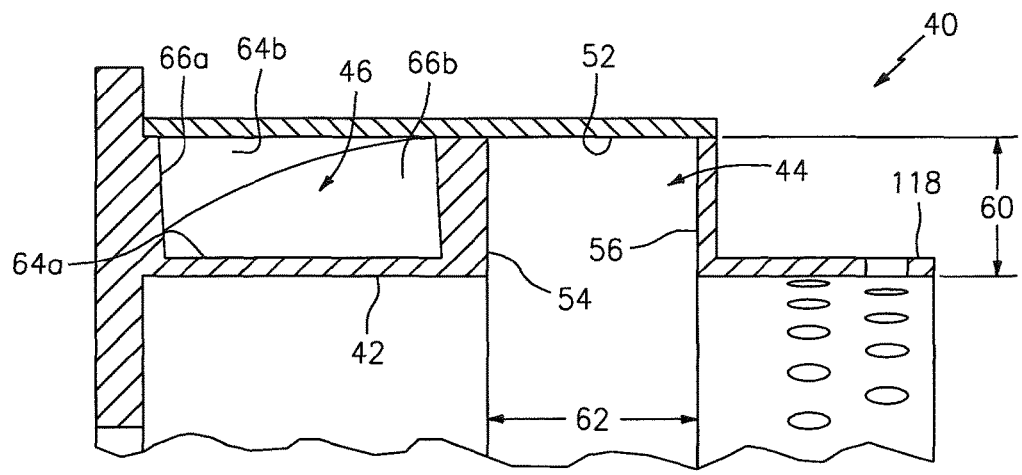
FIG. 5 is a partial sectional illustration of a gutter for the system of FIG. 1 at a first circumferential position about an axial centerline.
Figure 6:
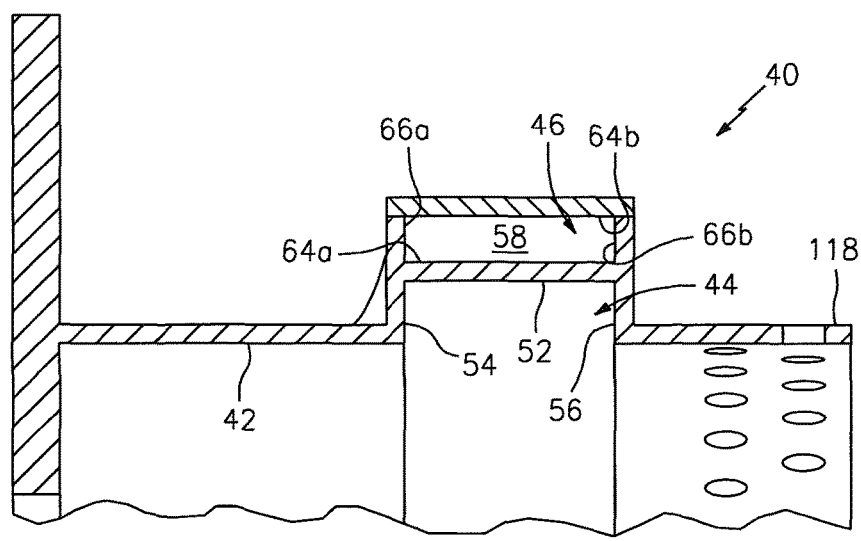
FIG. 6 is a partial sectional illustration of the gutter of FIG. 5 at a second circumferential position about the axial centerline.

Referring to FIGS. 5 and 6, the channel 44 is defined by one or more surfaces of the gutter 40, which may include a channel end surface 52 and opposing channel side surfaces 54 and 56. That is, geometrically, the channel 44 extends radially outward into the gutter 40 from the inner surface 42 to the end surface 52. Axially, the channel 44 extends within the gutter 40 between the side surfaces 54 and 56. Circumferentially, the channel 44 extends through the gutter 40 to a channel outlet 58, which is also an inlet (e.g., scoop) for the conduit 46.

The channel 44 has a substantially rectangular cross-sectional geometry with a cross-sectional channel area. Various other cross-sectional geometries may define the channel, as described below.

Referring to FIGS. 4 to 6, at least a portion of the area of the channel 44, located proximate (e.g., adjacent) and upstream of the channel outlet 58, is substantially equal to or less than between about two percent of the bore area. The channel height 60, in the engine radial direction, extends from the gutter inner surface 42 to the gutter end surface 52, and is substantially equal to or less than between about eight percent of the surface radius 50. The channel width 62, in the engine axial direction, extends between the gutter side surfaces 54 and 56, and is substantially equal to or less than between about five and about fifteen percent of the surface radius 50. These dimensional relationships may increase a fluid capture efficiency of the gutter 40 as described below.

Referring to FIG. 6, the channel outlet 58 has a substantially rectangular cross-sectional geometry. Alternatively, the channel outlet may have various other cross-sectional geometries that define the outlet area as described below. Referring to FIGS. 5 and 6, the rectangular cross-sectional geometry defines a cross-sectional outlet area that is substantially equal to between about fifty-five and about seventy-five percent of the channel area. This dimensional relationship may further increase the fluid capture efficiency of the gutter 40 as described below.

The conduit 46 is defined by one or more interior surfaces of the gutter 40, which may include opposing conduit end surfaces 64a-b and opposing conduit side surfaces 66a-b. In the engine radial direction, the conduit 46 extends within the gutter 40 between the end surfaces 64a-b. In the engine axial direction, the conduit 46 extends within the gutter 40 between the side surfaces 66a-b. The conduit 46 extends through the gutter 40 and may at least partially spiral around the centerline 28 from the channel outlet 58 to a conduit outlet 68 (see FIG. 2).

Referring to FIGS. 1, 2, 5 and 6, the gutter 40 is connected to a stationary support 70 such as a support strut that connects a bearing 72 to the turbine engine case. The gear train 22 is arranged and mated with the gutter 40. The channel 44 is aligned in the engine axial direction with one or more fluid passages 74 included in the gear train 22. These fluid passages 74 are arranged circumferentially around the centerline 28, and extend in the engine radial direction through the ring gear 32. The channel 44 is arranged in the engine axial direction between a pair of annular seals 76 (e.g., knife edge seals), which engage (e.g., contact) the gutter inner surface 42 in the engine radial direction. In this manner, the fluid passages 74 are fluidly coupled to the channel 44 and thus to the conduit 46 through the channel 44.

During system 20 operation, an inlet manifold 78 provides lubrication and/or heat exchange fluid (e.g., lubrication oil) to the gear train 22. The fluid may lubricate meshing surfaces of the sun, star and ring gears 30, 31a-e and 32 and/or engaging surfaces of the star gears 31a-e and the bearings 38a-e. The fluid may also or alternatively remove heat energy from the sun, star and ring gears 30-32 and/or the bearings 38a-e.

The fluid is collected from the gear train 22 with the gutter 40. Centrifugal force induced by rotation of the ring gear 32, for example, may cause at least a portion of the fluid within the gear train 22 to flow through the fluid passages 74 and radially into the channel 44. The channel outlet 58 directs (e.g., scoops) the fluid from the channel 44 into the conduit 46. The conduit 46 directs the fluid to the conduit outlet 68, which may be fluidly coupled to a fluid reservoir (e.g., an auxiliary oil reservoir for the gear train 22) or to any other lubrication system component. The fluid may subsequently be cooled and/or filtered, and re-circulated through the gear train 22 for further gear train component lubrication and/or cooling.

Under certain conditions, gas (e.g., air) within a plenum 80 surrounding the gear train 22 may flow with the fluid through the fluid passages 74 into the channel 44. The gas may also or alternatively leak into the channel 44 from between the gutter 40 and one or more of the seals 76. The ratio of gas to fluid within the channel 44 may affect the capture efficiency of the gutter 40. The term "capture efficiency" may describe the ratio of an amount of fluid output by the channel outlet 58 to an amount of fluid that initially flows into the channel 44 from the gear train 22.

Where the ratio of gas to fluid within a gutter channel is relatively large, the gas may reduce the velocity of the fluid in the engine circumferential direction. Such a reduction in circumferential velocity may cause the fluid to swirl within the channel increasing leakage at the end surface and thus the channel outlet; e.g., churn within the channel. The churning fluid may subsequently re-contact the ring gear, which may reduce power transfer efficiency of the gear train between the inlet and the outlet elements. The disclosed gutter 40, however, may reduce the ratio of gas to fluid within the channel 44 and thus increase the capture efficiency of the gutter 40 where the channel area is sized substantially equal to or less than about two percent of the bore area as set forth above. Such a configuration, for example, balances the channel area to fluid velocity relationship. Where the channel is relatively large, for example, the fluid velocity slows and may be unable to pressurize the auxiliary tanks. Where the channel is relatively small, the side leakage increases causing low capture efficiency.

The ratio of the outlet area to the channel area may also affect the capture efficiency of the gutter 40. For example, where the ratio of the outlet area to the channel area is relatively large, a relatively large channel outlet may receive (e.g., scoop) a relatively large amount of the gas from the channel along with the fluid. This received gas may choke or otherwise obstruct the flow of the fluid through the conduit, which may reduce the amount of the fluid the gutter collects and thus the capture efficiency of the gutter. Alternatively, where the ratio of the outlet area to the channel area is relatively small, a relatively small size of the channel outlet may restrict the amount of fluid that is received from the channel and thus reduce the capture efficiency of the gutter. The disclosed gutter 40, however, may reduce air choking within the conduit 46 without restricting the amount of gas received from the channel 44 where the outlet area is substantially equal to between about fifty-five and about seventy-five percent of the channel area as set forth above.

Figure 7:
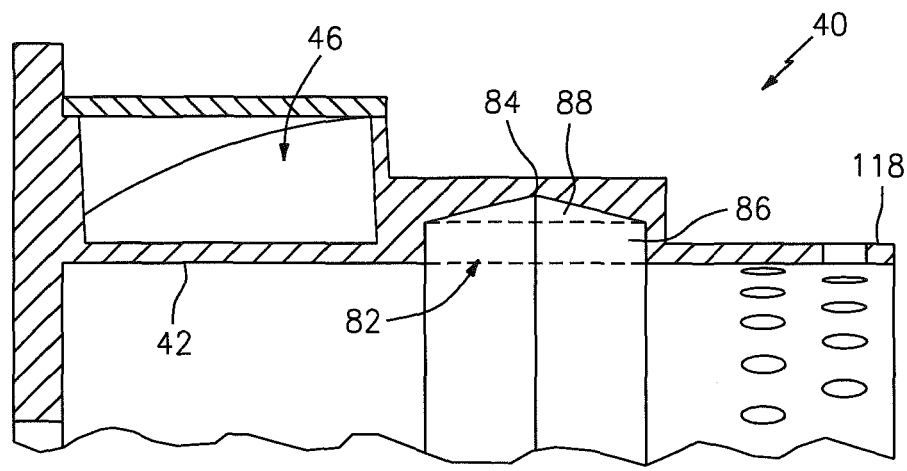
FIG. 7 is a partial sectional illustration of another gutter for the system of FIG. 1 at a first circumferential position about an axial centerline.
Figure 8:
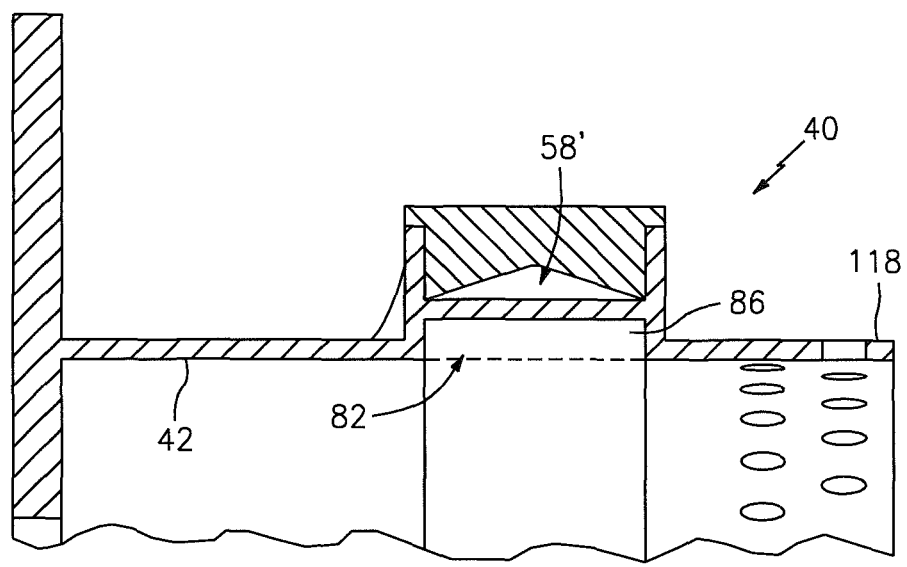
FIG. 8 is a partial sectional illustration of the gutter of FIG. 7 at a second circumferential position about the axial centerline.

FIG. 7 illustrates the gutter 40 with an alternative embodiment channel 82. In contrast to the channel 44 of FIG. 5, at least a portion of the channel 82 has a cross-sectional tapered channel geometry (e.g., a multi-region channel geometry) that defines the channel area. Referring to FIG. 8, as the channel 82 extends around the centerline 28, the tapered channel geometry transitions into a different (e.g., substantially rectangular) cross-sectional channel geometry. Alternatively, the entire channel 82 may have the tapered channel geometry.

Referring again to FIG. 7, the tapered channel geometry axially tapers as the channel 82 extends radially into the gutter 40 towards a channel end 84. The tapered channel geometry is formed by an inner region 86 and an outer region 88, each having a unique (e.g., different) geometry. The inner region 86 extends radially into the gutter 40 from the inner surface 42, and has a substantially rectangular geometry. The outer region 88 is located radially outboard of the inner region 86. The outer region 88 extends radially into the gutter 40 from the inner region 86 to the channel end 84, and has a substantially triangular geometry. Referring to FIG. 8, the channel outlet 58' has a corresponding substantially triangular cross-sectional geometry that defines the outlet area.

Figure 9:
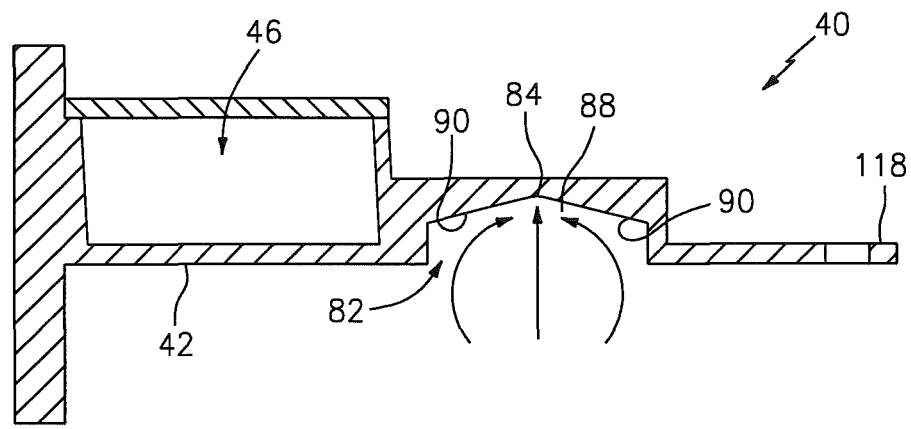
FIG. 9 is a partial sectional illustration of the gutter of FIG. 7 during system operation.
Figure 10:
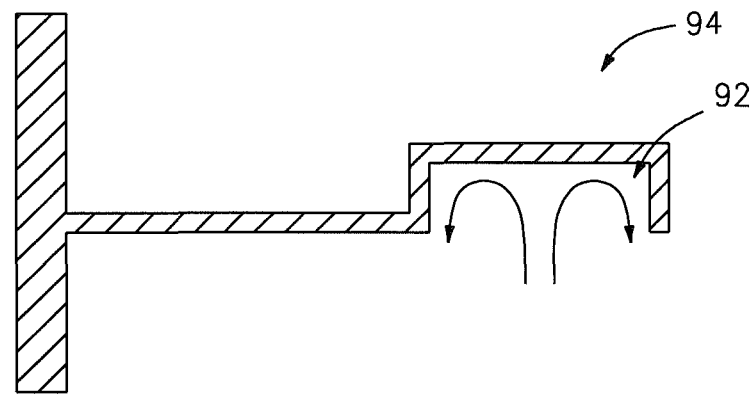
FIG. 10 is a partial sectional illustration of another gutter during system operation.

Referring to FIGS. 8 and 9, the tapered channel geometry may increase the capture efficiency of the gutter 40 by directing the received fluid radially outward towards the channel end 84. Canted surfaces 90 that define the outer region 88, for example, may funnel the fluid towards the channel end 84, and reduce swirl within the channel. The fluid may therefore collect into a mass at (e.g., proximate, adjacent or on) the channel end 84 as the fluid flows through the channel 82 towards the channel outlet 58'. Such a fluid mass may also be less affected by swirling gas within the channel 82 than dispersed fluid droplets. In contrast, as illustrated in FIG. 10, swirling gas within a channel 92 with a rectangular cross-sectional geometry may cause some of the fluid to swirl out of the channel 92 and thus away from the channel outlet. The rectangular cross-sectional geometry therefore may decrease the capture efficiency of the gutter 94.

Figure 11:
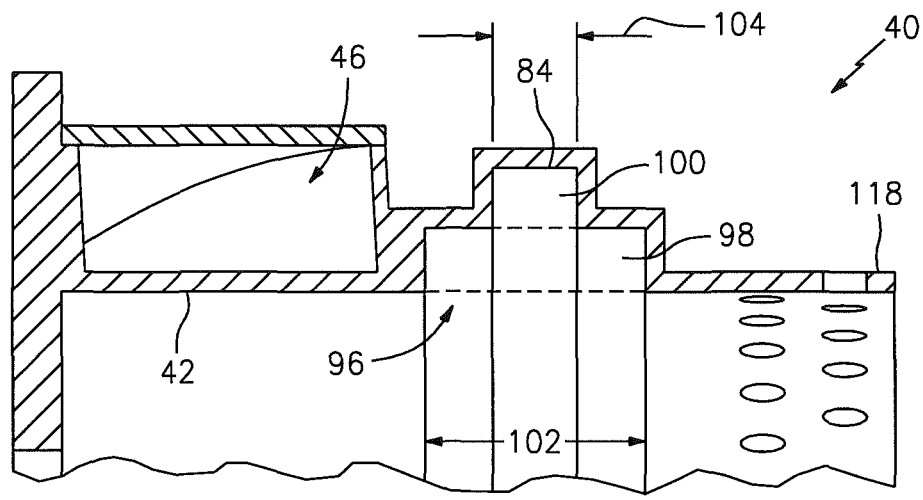
FIG. 11 is a partial sectional illustration of another gutter for the system of FIG. 1 at a first circumferential position about an axial centerline.

FIG. 11 illustrates the gutter 40 with another alternative embodiment channel 96. In contrast to the channel 82 of FIG. 7, the tapered channel geometry is formed by an inner region 98 and an outer region 100, each having a unique (e.g., different) width in the engine axial direction. Each also has a substantially uniform geometry.

The inner region 98 extends in the engine radial direction into the gutter 40 from the inner surface 42. The inner region 98 has a substantially rectangular geometry with a first width 102. The outer region 100 is located outboard in the engine radial direction of the inner region 98. The outer region 100 extends in the engine radial direction into the gutter 40 from the inner region 98 to the channel end 84. The outer region 100 has a substantially rectangular geometry with a second width 104 that is less than the first width 102.

Figure 12:
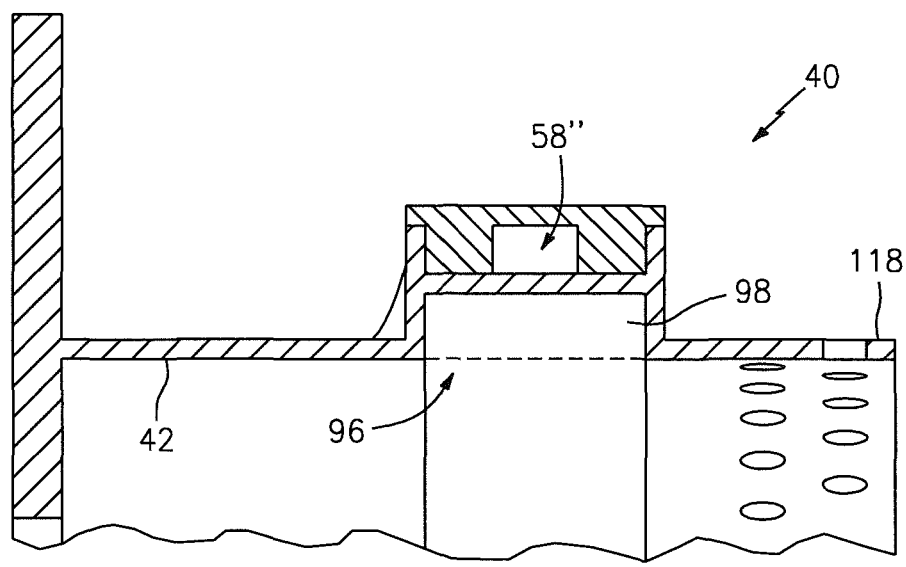
FIG. 12 is a partial sectional illustration of the gutter of FIG. 11 at a second circumferential position about the axial centerline.

Referring to FIG. 12, the channel outlet 58" has a corresponding substantially rectangular cross-sectional geometry. This geometry defines the outlet area.

Figure 13:
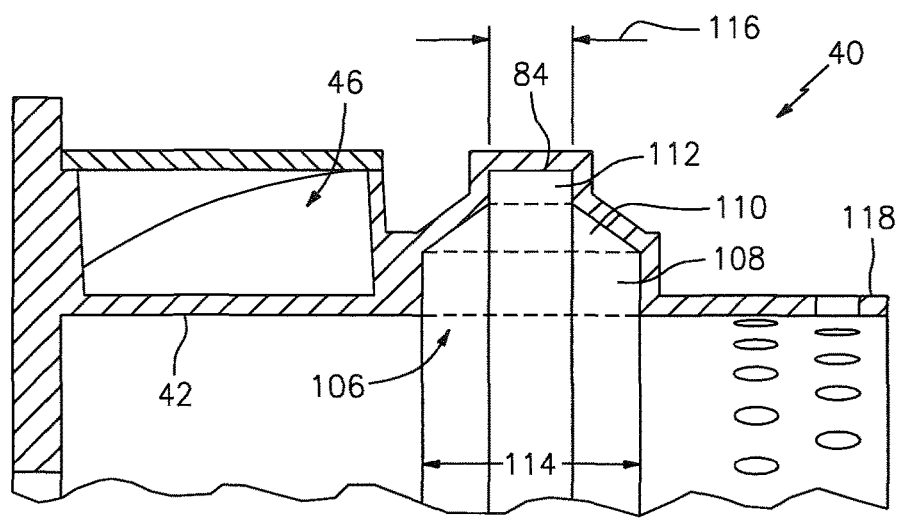
FIG. 13 is a partial sectional illustration of another gutter for the system of FIG. 1 at a first circumferential position about an axial centerline.

FIG. 13 illustrates the gutter 40 with still another alternative embodiment channel 106. In contrast to the channel 82 of FIG. 7, the tapered channel geometry is formed by an inner region 108, an intermediate region 110 and an outer region 112, each having a unique geometry and/or a unique width in the engine axial direction. The inner region 108 extends into the gutter 40 in the engine radial direction from the inner surface 42. The inner region 108 has a substantially rectangular geometry with a first width 114. The intermediate region 110 is located outboard in the engine radial direction of the inner region 108. The region 110 extends into the gutter 40 in the engine radial direction from the inner region 108.

The intermediate region 110 has a substantially trapezoidal geometry. The outer region 112 is located outboard of the inner in the engine radial direction and the intermediate regions 108 and 110. The region 110 extends into the gutter 40 in the engine radial direction from the intermediate region 110 to the channel end 84.

Figure 14:
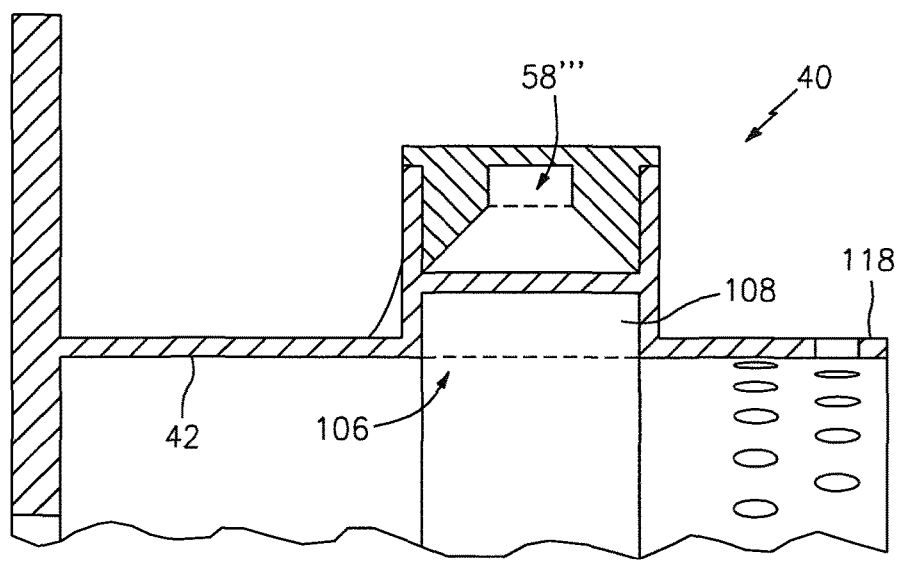
FIG. 14 is a partial sectional illustration of the gutter of FIG. 13 at a second circumferential position about the axial centerline.

The outer region 112 has a substantially rectangular geometry with a second width 116 that is less than the first width 114. Referring to FIG. 14, the channel outlet 58''' has a tapered (e.g., multi-region) cross-sectional geometry that corresponds to the geometries of the intermediate and the outer regions 110 and 112.

The gutter 40 may have various configurations other than those described above and illustrated in the drawings. For example, the gutter 40 may have a tapered cross-sectional geometry where the channel area is greater than about two percent of the bore area. In addition or alternatively, the gutter 40 may have a channel height that is greater than about eight percent of the surface radius, and/or a channel width that is greater than about fifteen percent of the surface radius. In addition or alternatively, the gutter 40 may have an outlet area that is less than about fifty-five percent of the channel area, or that is greater than about seventy-five percent of the channel area. The tapered cross-sectional geometry may have a single channel region with a substantially triangular or trapezoidal geometry, or any other type of axially tapered geometry. The gutter 40 may include a fluid baffle 118 (e.g., an apertured oil baffle) as illustrated in FIG. 1, or may be configured without a baffle as illustrated in FIG. 10. The gutter 40 may be configured as a stator as described above, or alternatively configured to rotate about the centerline 28; e.g., with the ring gear 32. The present invention therefore is not limited to any particular gutter configurations.

Figure 15:
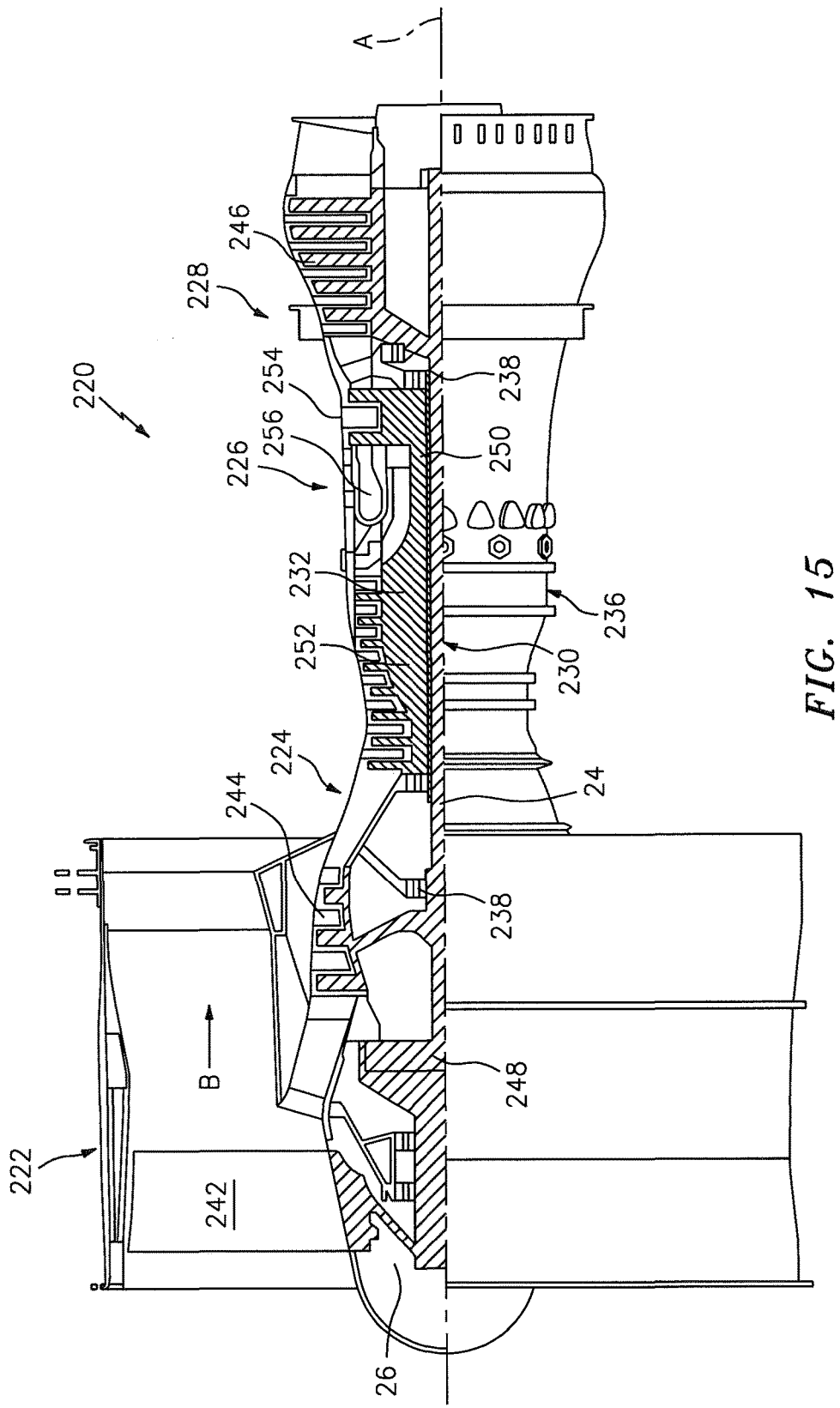
FIG. 15 is a side cutaway illustration of a geared turbine engine.

FIG. 15 is a side cutaway illustration of a geared turbine engine 220 which may include the turbine engine system 20 of FIG. 1. The turbine engine 220 is a two-spool turbofan that generally incorporates a fan section 222, a compressor section 224, a combustor section 226 and a turbine section 228. Alternative engines might include an augmentor section (not shown) among other systems or features. The fan section 222 drives air along a bypass flowpath while the compressor section 224 drives air along a core flowpath for compression and communication into the combustor section 226 then expansion through the turbine section 228. Although depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 220 generally includes a low spool 230 and a high spool 232 mounted for rotation about an engine central longitudinal axis A relative to an engine static structure 236 via several bearing structures 238. The low spool 230 generally includes an inner shaft 24 that interconnects a fan 242, a low pressure compressor 244 ("LPC") and a low pressure turbine 246 ("LPT"). The inner shaft 24 drives a fan rotor 26 of the fan 242 directly or through a geared architecture 248 to drive the fan 242 at a lower speed than the low spool 230. An exemplary reduction transmission is an epicyclic transmission, namely a planetary or star gear system.

The high spool 232 includes an outer shaft 250 that interconnects a high pressure compressor 252 ("HPC") and high pressure turbine 254 ("HPT"). A combustor 256 is arranged between the high pressure compressor 252 and the high pressure turbine 254. The inner shaft 24 and the outer shaft 250 are concentric and rotate about the engine central longitudinal axis A (e.g., the centerline 28) which is collinear with their longitudinal axes.

Core airflow is compressed by the low pressure compressor 244 then the high pressure compressor 252, mixed with the fuel and burned in the combustor 256, then expanded over the high pressure turbine 254 and low pressure turbine 246. The turbines 254, 246 rotationally drive the respective low spool 230 and high spool 232 in response to the expansion.

The main engine shafts 24, 250 are supported at a plurality of points by bearing structures 238 within the static structure 236. It should be understood that various bearing structures 238 at various locations may alternatively or additionally be provided.

In one non-limiting example, the gas turbine engine 220 is a high-bypass geared aircraft engine. In a further example, the gas turbine engine 220 bypass ratio is greater than about six (6:1). The geared architecture 248 can include an epicyclic gear train (e.g., the gear train 22), such as a planetary gear system or other gear system. An example epicyclic gear train has a gear reduction ratio of greater than about 2.3:1, and in another example is greater than about 2.5:1. The geared turbofan enables operation of the low spool 230 at higher speeds which can increase the operational efficiency of the low pressure compressor 244 and low pressure turbine 246 and render increased pressure in a fewer number of stages.

A pressure ratio associated with the low pressure turbine 246 is pressure measured prior to the inlet of the low pressure turbine 246 as related to the pressure at the outlet of the low pressure turbine 246 prior to an exhaust nozzle of the gas turbine engine 220. In one non-limiting embodiment, the bypass ratio of the gas turbine engine 220 is greater than about ten (10:1), the fan diameter is significantly larger than that of the low pressure compressor 244, and the low pressure turbine 246 has a pressure ratio that is greater than about 5 (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 222 of the gas turbine engine 220 is designed for a particular flight condition—typically cruise at about 0.8 Mach and about 35,000 feet. This flight condition, with the gas turbine engine 220 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 222 without the use of a Fan Exit Guide Vane system. The low Fan Pressure Ratio according to one non-limiting embodiment of the example gas turbine engine 220 is less than 1.45. Low Corrected Fan Tip Speed is the actual fan tip speed divided by an industry standard temperature correction of "T"/$518.7^{0.5}$ in which "T" represents the ambient temperature in degrees Rankine. The Low Corrected Fan Tip Speed according to one non-limiting embodiment of the example gas turbine engine 220 is less than about 1150 fps (351 m/s).

A person of skill in the art will recognize the turbine engine system 20 of FIG. 1 may be included in various turbine engines other than the one described above. The turbine engine system 20, for example, may be included in a geared turbine engine where a gear train connects one or more shafts to one or more rotors in a fan section and/or a compressor section. Alternatively, the turbine engine system 20 may be included in a turbine engine configured without a gear train. The present invention therefore is not limited to any particular types or configurations of turbine engines.

The terms "upstream", "downstream", "inner" and "outer" are used to orient the components of the turbine engine system 20 described above relative to the turbine engine and its axis. A person of skill in the art will recognize, however, one or more of these components may be utilized in other orientations than those described above. The present invention therefore is not limited to any particular spatial orientations.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A turbine engine system, comprising:
a gear train with an axial centerline; and
a gutter disposed radially outside of the axial centerline, the gutter including
an inner surface at least partially defining an axial bore in which the gear train is arranged; and
a channel that receives fluid directed out of the gear train, the channel extending radially into the gutter from the inner surface, and circumferentially to a channel outlet;
wherein the axial bore has a cross-sectional bore area, and the channel has a cross-sectional channel area that is equal to or less than two percent of the cross-sectional bore area.

2. The turbine engine system of claim 1, wherein the cross-sectional channel area is defined by at least a portion of the channel located adjacent and upstream of the channel outlet.

3. The turbine engine system of claim 1, wherein the inner surface has a surface radius; and the channel has a radially extending channel height that is equal to or less than eight percent of the surface radius.

4. The turbine engine system of claim 1, wherein the inner surface has a surface radius; and the channel has an axially extending channel width that is equal to or less than fifteen percent of the surface radius.

5. The turbine engine system of claim 1, wherein the channel outlet has a cross-sectional outlet area that is between fifty-five and seventy-five percent of the cross-sectional channel area.

6. The turbine engine system of claim 1, wherein at least a portion of the channel has a cross-sectional channel geometry that transitions between a first geometry and a second geometry as the channel extends circumferentially within the gutter.

7. The turbine engine system of claim 1, wherein at least a portion of the channel has rectangular cross-sectional channel geometry.

8. The turbine engine system of claim 1, wherein the channel extends radially into the gutter to a channel end; and at least a portion of the channel has a cross-sectional channel geometry that tapers axially as the channel extends radially towards the channel end.

9. The turbine engine system of claim 1, wherein at least a portion of the channel has a cross-sectional channel geometry formed by an inner region and an outer region located radially outboard of the inner region; and the inner region has a rectangular geometry, and the outer region has a triangular geometry.

10. The turbine engine system of claim 1, wherein the channel outlet has a triangular cross-sectional geometry.

11. The turbine engine system of claim 1, wherein the gutter further includes a conduit that extends through the gutter and spirals at least partially around the axial centerline between the channel outlet and a conduit outlet.

12. The turbine engine system of claim 1, wherein the gear train includes one or more fluid passages arranged circumferentially around the axial centerline and aligned axially with the channel; and the one or more fluid passages are fluidly coupled to the channel outlet through the channel.

13. The turbine engine system of claim 1, wherein the gear train is configured as a planetary gear train or a star gear train.

14. The turbine engine system of claim 1, further comprising: a plurality of turbine engine rotors arranged along the axial centerline and including a first rotor and a second rotor, each of the turbine engine rotors including a plurality of rotor blades arranged around and connected to a rotor disk; wherein the first rotor is connected to and driven by the second rotor through the gear train.

15. The turbine engine system of claim 14, wherein the first rotor is configured as a fan rotor and the second rotor is configured as a turbine rotor.

* * * * *